July 7, 1959  D. K. BADERTSCHER ET AL  2,893,514
LUBRICATION SYSTEM FOR AN ENGINE
Filed Nov. 25, 1957  4 Sheets-Sheet 1
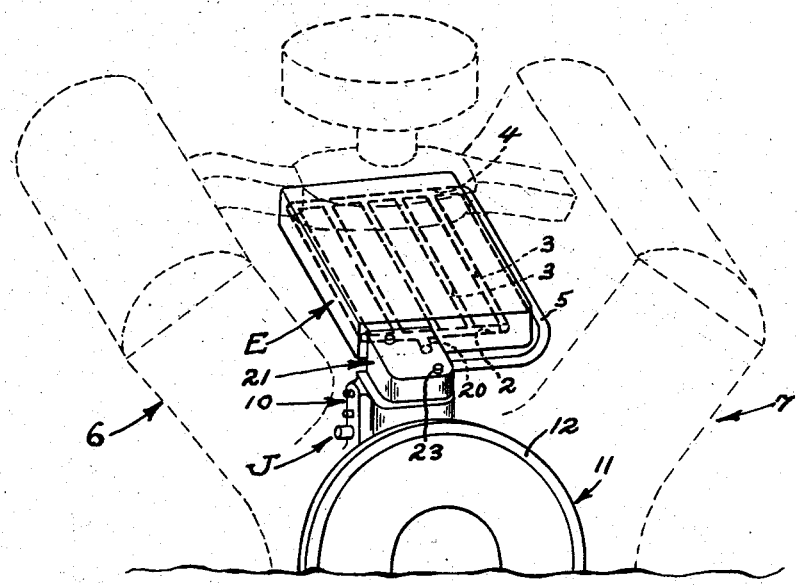
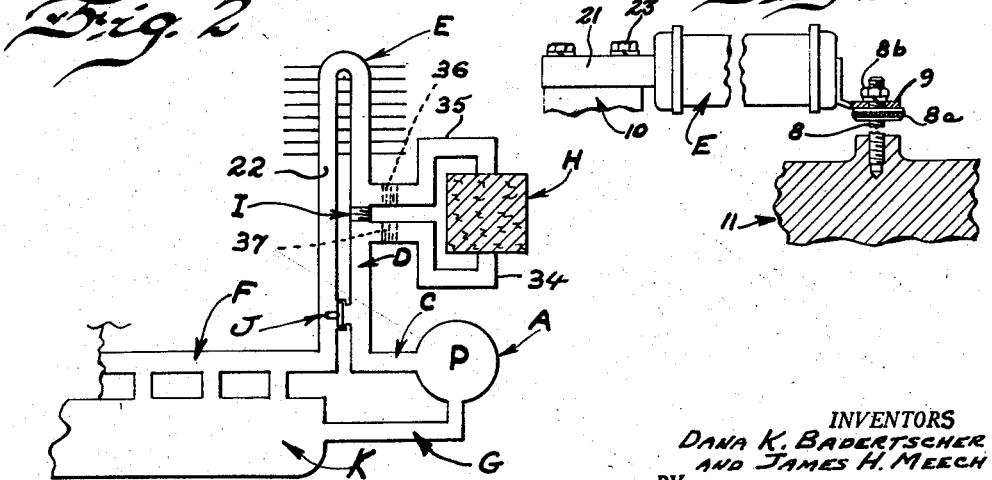
INVENTORS
DANA K. BADERTSCHER
AND JAMES H. MEECH
BY
Carl J. Barbee
ATTORNEY

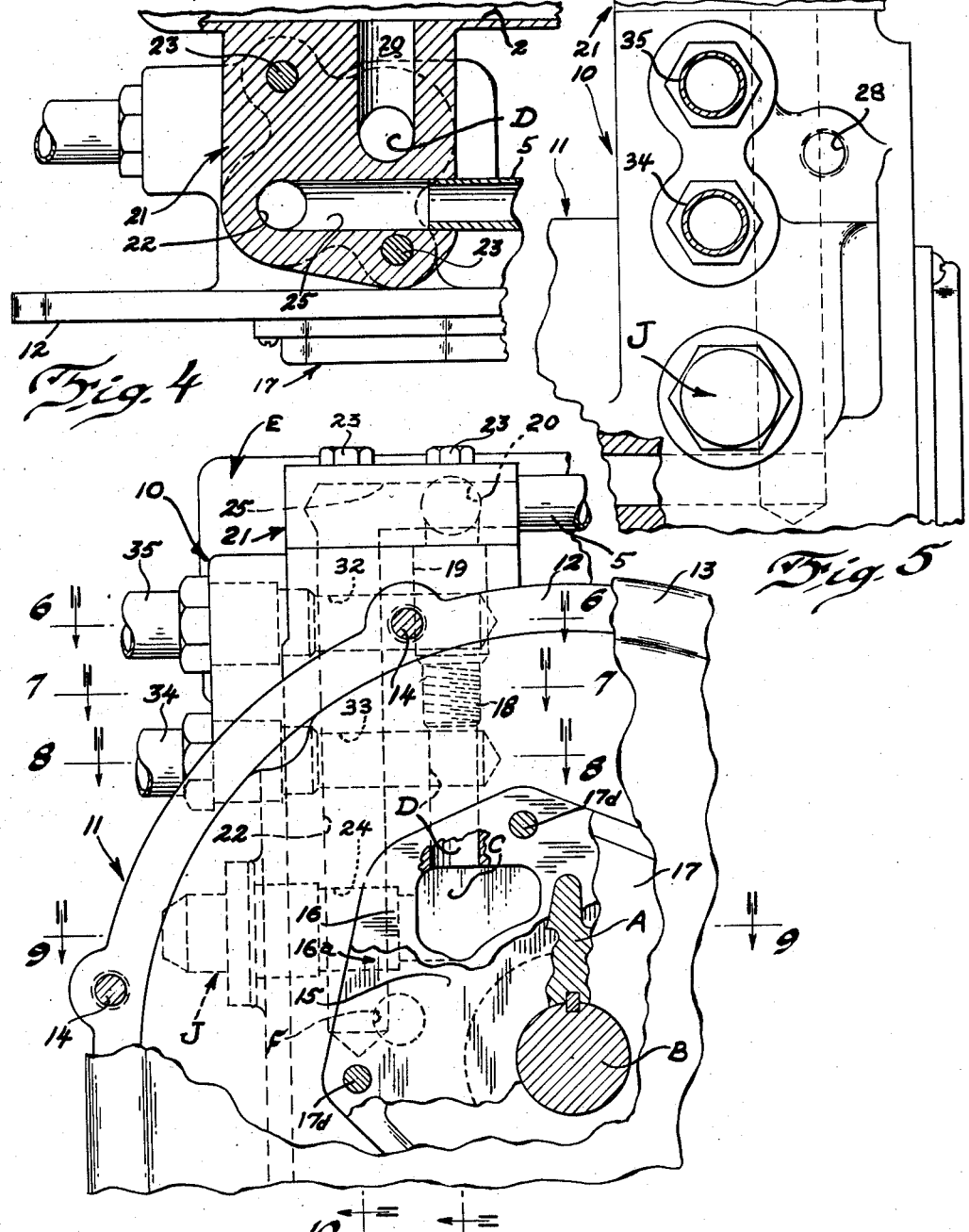

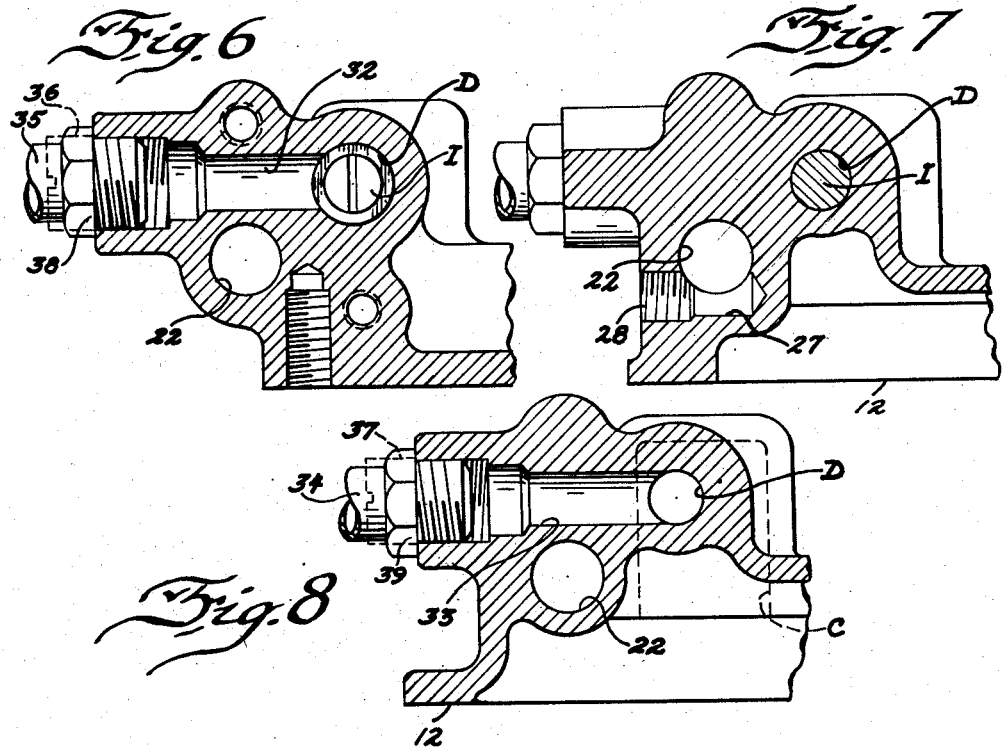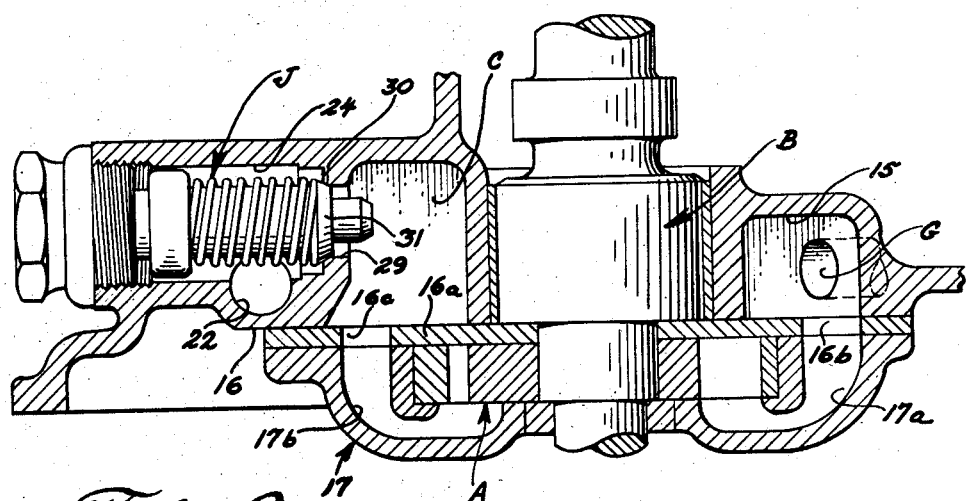

July 7, 1959   D. K. BADERTSCHER ET AL   2,893,514
LUBRICATION SYSTEM FOR AN ENGINE
Filed Nov. 25, 1957   4 Sheets-Sheet 4
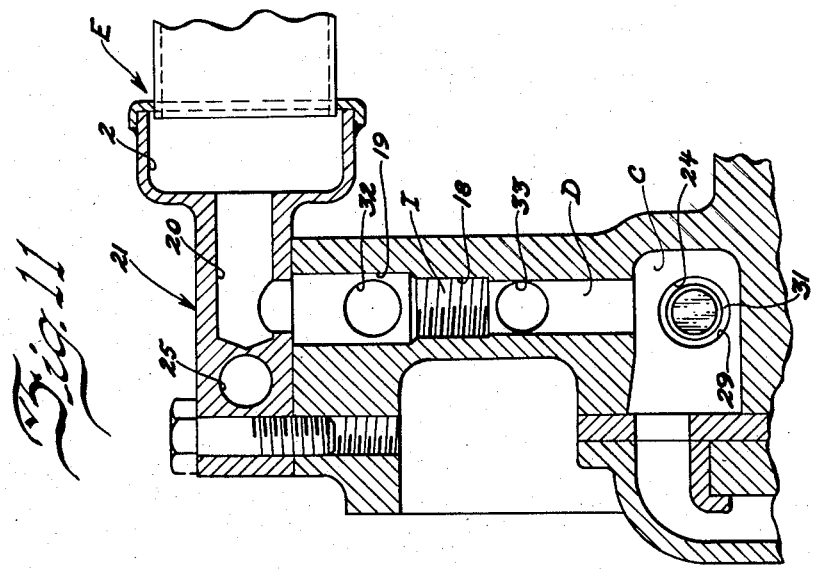
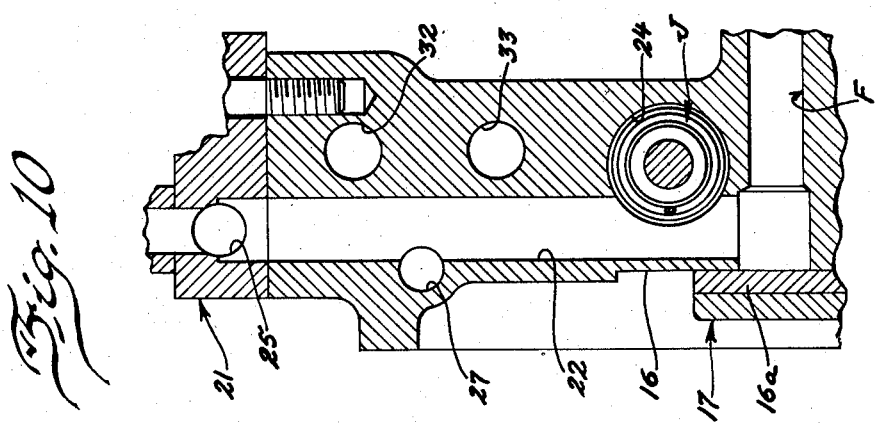
INVENTORS
DANA K. BADERTSCHER
AND JAMES H. MEECH
BY
Carl J. Barbee
ATTORNEY

United States Patent Office 2,893,514
Patented July 7, 1959

2,893,514

LUBRICATION SYSTEM FOR AN ENGINE

Dana K. Badertscher and James H. Meech, Grosse Pointe Park, Mich., assignors to American Motors Corporation, Kenosha, Wis., a corporation of Maryland Application November 25, 1957, Serial No. 698,475

7 Claims. (Cl. 184—6)

The invention relates to a lubrication system for an internal combustion engine and has particular reference to a system which is suitable for an air-cooled type engine.

A specific object is to provide a system incorporating a routing in which a full-flow type filtering unit can be optionally included in the routing with a minimum of alteration or adjustment.

A more specific object is to provide in a single casting a system of oil passages wherein a circumventing route may be included or excluded simply by inserting or removing a threaded plug in a primary passage.

A further object is to include in the lubricating system a temperature and pressure sensitive valve for by-passing the oil flow around the cooler under conditions of abnormal operating temperature and pressure. The by-pass valve is incorporated within the system of passages in the single casting.

A further object is to provide in a lubrication system an arrangement of passages within a single casting thereby eliminating external plumbing and its attendant faults and reducing manufacturing costs as well as material costs.

Other objects and advantages will be apparent from the ensuing specification and appended drawings, in which:

Figure 1 is a generally schematic perspective plan view of an air-cooled type internal combustion engine embodying the invention;

Figure 2 is a purely schematic view of the lubrication system;

Figure 3 is a fragmentary front view of the engine showing a portion of the lubrication system including the oil distributing tower of the crankcase casting;

Figure 4 is a fragmentary sectional view of that portion of the system shown in Figure 3, the forward portion only of the oil cooler being shown and this being shown mostly in section;

Figure 5 is a fragmentary side view of the construction shown in Figure 3;

Figure 6 is a fragmentary sectional view taken on the line 6—6 of Figure 3;

Figure 7 is a fragmentary sectional view taken on the line 7—7 of Figure 3;

Figure 8 is a fragmentary sectional view taken on the line 8—8 of Figure 3;

Figure 9 is a fragmentary sectional view taken on the line 9—9 of Figure 3;

Figure 10 is a fragmentary sectional view taken on the line 10—10 of Figure 3;

Figure 11 is a fragmentary sectional view taken on the line 11—11 of Figure 3; and Figure 12 is a fragmentary side elevational view on a reduced scale of the oil cooler and showing the mounting of same relative to the oil distributing tower and the engine block.

Referring generally to Figures 1, 2, 3 and 9 the lubrication system includes a pump A which may be driven by one of the engine shafts, in this instance preferably the cam shaft B, and the oil which reaches the pump from the oil pan K through passage G in the crankcase is discharged by the pump into the inlet chamber C from whence it travels through a primary lubricant route which commences with the primary passage D, then proceeds through the heat radiating core E and back through the primary return passage 22 to the oil gallery F which serves as a trunk line for feeding oil to the various functional components of the engine, the oil eventually draining back to the oil pan from whence it is then lifted by the pump for repetition of the lubrication cycle. It will be understood that the lubrication system includes the necessary passages or piping for lubricating the various engine parts as is conventional practice in the internal combustion engine art, however, only that portion of the lubrication system which is pertinent to the invention is disclosed herein.

If it is desired to direct all of the oil through a filtering device H, this is accomplished by inserting the threaded plug I in the primary oil passage D and connecting the pipes leading from the filter (as will be explained in detail hereinafter) on opposite sides of the plug I whereupon the oil is directed through the secondary or auxiliary route consisting of passage 33 and tubing 34, the filter H, the tubing 35 and passage 32 and is then redirected into the primary passage D for continuing its travel through the oil cooling device as has been previously explained.

A pressure and thermo-responsive valve J controls a by-pass route leading from the primary distribution passage to the return passage for circumventing the cooling device whenever oil temperature drops below that desired in normal engine operation and whenever the pressure through the cooler or oil filter exceeds a pre-determined maximum.

The oil cooling device (see Figure 1) may be of a conventional type in the form of a heat radiating core having a primary feed passage 2 at one end and branch passages 3 leading to the primary return passage 4 at the opposite end thereof, an oil return tube 5 leading from the primary return passage to the return passage 25 in the oil cooler cover casting identified generally by the numeral 21. The heat radiating core, of course, includes a multitude of thin heat transfer plates appropriately secured to the tubes 3, and the core is situated between the banks of cylinders indicated by the numerals 6 and 7 and is suitably anchored at its forward end to the oil distributing tower 10 and at its rearward end to the crankcase casting. Viewing Figure 12 it will be noted that a stud 8 mounted upright in the crankcase receives the apertured bracket 9 which is secured to the rear end of the oil cooler. A thumb nut 8a is brought into contact with the underside of the bracket and a nut 8b and lock washer are then added onto the upper end of the stud. By using the thumb nut 8a the position of the cooler is not changed and no undesirable stresses are imposed on the cooler. Appropriate shrouding above the engine (not shown) directs a portion of the stream of engine cooling air through the oil cooling core for effecting cooling of the lubrication oil.

The oil distribution system is generally housed within the upwardly projecting tower 10 which is formed as part of the principal engine casting serving as the crankcase. The crankcase casting may be identified by the numeral 11, such casting terminating at its forward end with an enlarged portion serving to accommodate the timing gears annd the oil pump. This timing gear housing portion has a generally semi-circular rim 12 against which the housing cover 13 is secured as by means of bolts 14, only two of which are shown in Figure 3. Referring to Figures 3, 9 and 11 it will be noted that the pump A is mounted on the forward portion of the cam shaft B, the pump body 17 being anchored to the crankcase by means of bolts 17d. A cam shaft thrust plate 16a is positioned between the pump body and the end face 16 of the crankcase casting, such plate being ported at 16b and 16c to establish communication between the inlet and outlet sides respectively of the pump and the crankcase cavities 15 and C respectively. Thus, viewing Figure 9 it will be seen that the oil is lifted from the oil pan through crankcase passage G into cavity 15 then through port 16b, pump body passage 17a and into the inlet side of the pump. The oil is discharged at the outlet side of the pump into pump body passage 17b, through port 16c and into crankcase cavity C, which, as has been previously explained, is the starting point of the oil distribution system.

The primary oil passage D opens into the cavity C as shown in Figures 3 and 11 and extends throughout the height of the tower 10, having an internally threaded central portion 18, and terminating with an enlarged counter bore portion 19 which opens into the oil passage 20 in the cover casting identified generally by the numeral 21.

The cover casting is secured in a fluid-tight manner to the upper end of the distribution tower by means of suitable bolts 23 so as to establish fluid-tight continuation of the tower passages 19 and 22 to the appropriate transfer passages in the cover casting. It will be understood that passage 22 opens into passage 25. Thus the bolts 23 serve to anchor the forward end of the cooler and to establish the necessary plumbing connections between the cooler and the oil distribution tower.

The oil travels through passage 19, passage 20, then into passage 2 of the cooling device and on through the cooling device from whence it returns via tubing 5 into passage 25 then on down through passage 22 and into the gallery F.

The return passage 22 extends throughout the height of the distribution tower and terminates by opening into the gallery F, the end of such latter passage being closed off by means of the plate 16a (see Figure 10). A transverse bore 27 (see Figures 7 and 10) intersects the return passage 22 and may be internally threaded at 28 to receive a suitable tubing fitting (not shown) for directing a supply of oil to one set of rocker arms (not shown).

The passage 22 is also intersected by the transverse valve bore 24 which establishes communication between oil reception pocket C and the return passage 22. The bore 24 is reduced at 29 to provide an annular valve seat 30 against which the valve head 31 is normally seated (during engine operation) thereby closing off communication between passage 22 and passage D (which opens into the pocket C). The operation of the valve will be explained hereinafter. The transverse bores 32 and 33 intersect with the passage D, one above and the other below the internally threaded section 18 of said passage and such bores serve as the exit and entry ends respectively of the secondary lubricant route. A section of tubing 34 leads to the entrance side of the filtering unit H and an additional section of tubing 35 extends from the return side of the filtering unit to bore 32. Thus, when the threaded plug I is installed as shown in Figures 2, 6 and 7, the oil is pumped into the lower end of passage D then through passage 33, tubing 34, filtering unit H, tubing 35, passage 32 and back into the upper section 19 of passage D from whence the oil then travels through the cooling device and then back through passage 22 to the oil gallery.

In the filtering unit is not to be used, then the passages 32 and 33 would be closed off with suitable plugs as indicated in dotted lines at 36 and 37 in Figures 6 and 8, it being understood that the tubing fittings 38 and 39 would be removed before installing the plugs. The plug I would likewise be removed so that the oil can travel directly through passage D to the cooling device.

Under some conditions of operation of the engine, such as during warm-up thereof, or continued operation in exceptionally low temperatures it is desirable to raise the temperature of the lubricating oil as rapidly as possible until the desired operating temperature is reached. During this period, the period, the pressure and thermoresponsive valve J is open, the valve head 31 being retracted away from the valve seat, whereupon a substantial portion of the lubricating oil entering chamber C is by-passed through passage 29—24 directly into the return passage 22 and back to the oil gallery. The pressure and thermo-responsive valve is of conventional construction and as the temperature of the oil within the bore 24 reaches the desired level for proper engine operation, the valve head 31 is moved toward the closed position maintaining an oil temperature balance by directing a portion of the oil through the cooling unit before being circulated through the engine. The valve, which is also pressure responsive, opens under conditions wherein extremely low temperatures are encountered, which temperatures increase the viscosity of the oil traveling through the cooler thereby requiring greater pressure in the system to circulate the oil through the oil cooler. If such pressure becomes too great, the valve will open causing a by-passing of the cooler.

We claim:

1. A lubricating system for an internal combustion engine comprising: an oil pan; a crankcase; a lubricant route leading from and returning to the oil pan; a pump in the route for inducing the flow of a lubricant therethrough; a lubricant cooling device in the route; a lubricant distribution tower carried on the crankcase and having a feed passage and a return passage formed therein and opening through one end thereof, said feed and return passages serving as portions of the lubricant route; a cover secured to the tower and having transfer passages therethrough; said oil cooling device having an inlet opening and an outlet opening and said transfer passages separately establishing communication between the oil cooling device openings and the tower feed and return passages.

2. Apparatus as set forth in claim 1 wherein the tower has a by-pass passage establishing communication between the tower feed and return passages for circumventing the oil cooling device and a thermally responsive valve normally closes off communication between the tower feed and return passages by closing off the by-pass passage.

3. A lubricating system for an internal combustion engine comprising: an oil pan; a crankcase casting; a lubricant route leading from and returning to the oil pan; a pump in the route for inducing the flow of a lubricant therethrough; a lubricant cooling device in the route; a lubricant distribution tower formed integrally with the crankcase casting and projecting therefrom; said tower having a feed passage and a return passage formed therein and opening through one end thereof, said feed and return passages serving as portions of the lubricant route; a cover casting having an end portion serving as a cap to close off one end of the lubricant cooling device and a body portion secured to and closing off the end of the tower and having transfer passages therethrough; said oil cooling device having an inlet opening and an outlet opening and said transfer passages separately establishing communication between the oil cooling device openings and the tower feed and return passages.

4. A lubricating system for an internal combustion engine comprising: an oil pan; a crankcase; a primary lubricant route leading from and returning to the oil pan; a secondary lubricant route having entry and exit ends opening into the primary lubricant route; a pump in one route for inducing flow of the lubricant therethrough; a lubricant distribution tower associated with the crankcase and having a feed passage and a return passage included as portions of the primary lubricant route, said tower also having spaced second feed and return passages included as portions of the secondary lubricant route and serving as the entry and exit ends of the secondary route, said secondary feed and return passages intersecting the primary feed passage at different locations therealong, whereby closing of the primary feed passage in the area between the points of intersection causes lubricant flow to include the secondary route in addition to the primary route and means for closing off the secondary feed and return passages when the primary feed passage is opened.

5. A lubricating system for an internal combustion engine comprising: an oil pan; a crankcase; a primary lubricant route leading from and returning to the oil pan; a secondary lubricant route having entry and exit ends opening into the primary lubricant route; a pump in one route for inducing flow of the lubricant therethrough; a lubricant distribution tower associated with the crankcase and having a feed passage and a return passage included as portions of the primary lubricant route, said tower also having spaced secondary feed and return passages included as portions of the secondary lubricant route and serving as the entry and exit ends of the secondary route, said secondary feed and return passages intersecting the primary feed passage at different locations therealong, said primary feed passage in the area between the points of intersection being internally threaded and a removable plug being threaded into the internally threaded area of the primary feed passage, whereby closing of the primary feed passage in the aera between the points of intersection causes lubricant flow to include the secondary route in addition to the primary route.

6. A lubricating system for an internal combustion engine comprising: an oil pan; a crankcase; a primary lubricant route leading from and returning to the oil pan; a secondary lubricant route having entry and exit ends opening into the primary lubricant route; a pump in one route for inducing flow of the lubricant therethrough; a lubricant distribution tower associated with the crankcase and having a primary feed passage and a primary return passage included as portions of the primary lubricant route, said tower also having spaced secondary feed and return passages included as portions of the secondary lubricant route and serving as the entry and exit ends of the secondary route, said secondary feed and return passages intersecting the primary feed passage at different locations therealong, whereby closing of the primary feed passage in the area between the points of intersection causes lubricant flow to include the secondary route in addition to the primary route, said tower also having a by-pass passage situated beneath the level of the secondary feed and secondary return passages and establishing communication between the primary feed passage and primary return passage, whereby to shunt the primary lubricant route; a thermally responsive valve in the by-pass passage for normally closing off communication between the tower feed and return passages via the by-pass passage.

7. A lubricating system for an internal combustion engine comprising: an oil pan; a crankcase; a primary lubricant route leading from and returning to the oil pan; a secondary lubricant route having entry and exit ends opening into the primary lubricant route; a pump in one route for inducing flow of the lubricant therethrough; a lubricant distribution tower secure with the crankcase and having a primary feed passage and a primary return passage included as portions of the primary lubricant route, said tower also having spaced secondary feed and return passages included as portions of the secondary lubricant route and serving as the entry and exit ends of the secondary route, said secondary feed and return passage being situated one above the other and intersecting the primary feed passage at different locations therealong whereby closing of the primary feed passage in the area between the points of intersection causes lubricant flow to include the secondary route in addition to the primary route, said primary return passage being offset with reference to a plane drawn through the longitudinal axes of the secondary feed and return passages; said tower also having a by-pass passage situated beneath the level of the secondary feed and secondary return passages and intersecting the primary feed and return passages whereby to establish communication between the primary feed passage and the primary return passage and to shunt the primary lubricant route; a thermally responsive valve in the by-pass passage for normally closing off communication between the primary feed and return passages via the by-pass passage.

References Cited in the file of this patent
UNITED STATES PATENTS

| | | |
|---|---|---|
| 1,554,731 | Jencick | Sept. 22, 1925 |
| 1,948,929 | MacPherson | Feb. 27, 1934 |
| 2,286,816 | Kishline | June 16, 1942 |
| 2,801,006 | Hultgren | July 30, 1957 |

UNITED STATES PATENT OFFICE
CERTIFICATE OF CORRECTION

Patent No. 2,893,514

July 7, 1959

Dana K. Badertscher et al.

It is hereby certified that error appears in the printed specification of the above numbered patent requiring correction and that the said Letters Patent should read as corrected below.

Column 2, line 67, for "annd" read -- and --; column 3, line 68, for "In" read -- If --; column 4, line 5, strike out "the period,"; line 75, for "second" read -- secondary --; column 5, line 29, for "aera" read -- area --.

Signed and sealed this 8th day of December 1959.

(SEAL)
Attest:

KARL H. AXLINE
Attesting Officer

ROBERT C. WATSON
Commissioner of Patents